United States Patent
Kiiski et al.

(10) Patent No.: US 11,299,441 B2
(45) Date of Patent: Apr. 12, 2022

(54) CALCIUM SULFATE UREA GRANULES AND METHODS FOR PRODUCING AND USING THE SAME

(71) Applicant: SABIC GLOBAL TECHNOLOGIES B.V., Bergen op Zoom (NL)

(72) Inventors: Harri Kiiski, Riyadh (SA); Andrew George Kells, Riyadh (SA); Mohamed Akasha M. Khaleel, Riyadh (SA); Nilkamal Bag, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 120 days.

(21) Appl. No.: 16/631,206

(22) PCT Filed: Jul. 19, 2018

(86) PCT No.: PCT/IB2018/055397
§ 371 (c)(1),
(2) Date: Jan. 15, 2020

(87) PCT Pub. No.: WO2019/016761
PCT Pub. Date: Jan. 24, 2019

(65) Prior Publication Data
US 2020/0148607 A1 May 14, 2020

Related U.S. Application Data

(60) Provisional application No. 62/626,932, filed on Feb. 6, 2018.

(30) Foreign Application Priority Data

Jul. 21, 2017 (IN) .............................. 201711026033

(51) Int. Cl.
*C05G 5/12* (2020.01)
*C05G 5/30* (2020.01)
(Continued)

(52) U.S. Cl.
CPC ................ *C05G 5/12* (2020.02); *C05C 9/005* (2013.01); *C05D 3/00* (2013.01); *C05G 5/30* (2020.02); *C05G 5/36* (2020.02)

(58) Field of Classification Search
None
See application file for complete search history.

(56) References Cited

U.S. PATENT DOCUMENTS

| 2,074,880 A | 3/1937 | Whittaker et al. |
| 2,157,541 A | 5/1939 | Hosokawa |

(Continued)

FOREIGN PATENT DOCUMENTS

| AU | 200118807 | 6/2001 |
| AU | 2012250293 | 12/2012 |

(Continued)

OTHER PUBLICATIONS

Achard, et al., "A new route for urea-superphosphate fertilizers," *Phosphorus and Potassium*, 1994, 191:27-33.

(Continued)

*Primary Examiner* — Wayne A Langel
(74) *Attorney, Agent, or Firm* — Norton Rose Fulbright US LLLP

(57) ABSTRACT

A calcium sulfate urea (UCS) fertilizer granule and methods for making and using the same are disclosed. The granule can include urea, calcium sulfate, and a calcium sulfate urea adduct, wherein a portion of the surface of the calcium sulfate urea adduct includes a layer comprising urea, calcium sulfate, or calcium sulfate urea adduct, or any combination or all thereof.

12 Claims, 3 Drawing Sheets

(51) Int. Cl.
    *C05C 9/00*     (2006.01)
    *C05D 3/00*     (2006.01)

(56) References Cited

U.S. PATENT DOCUMENTS

| | | | |
|---|---|---|---|
| 3,419,379 A * | 12/1968 | Goodale | C05C 1/02 71/60 |
| 3,925,053 A | 12/1975 | Kealy | |
| 3,976,467 A | 8/1976 | Seferian et al. | |
| 4,019,889 A | 4/1977 | Kealy | |
| 4,283,423 A | 8/1981 | Watkins et al. | |
| 4,478,632 A | 10/1984 | Van Hijfte et al. | |
| 4,507,139 A | 3/1985 | Sullivan et al. | |
| 5,264,017 A | 11/1993 | Van de Walle | |
| 5,409,516 A | 4/1995 | Achard et al. | |
| 5,716,591 A | 2/1998 | Crispoldi | |
| 5,917,110 A | 6/1999 | Kust | |
| 2004/0031303 A1 | 2/2004 | Whitehurst et al. | |
| 2005/0144997 A1 | 7/2005 | Phillips et al. | |
| 2018/0297903 A1 | 10/2018 | Ledoux et al. | |

FOREIGN PATENT DOCUMENTS

| | | |
|---|---|---|
| CN | 1063095 | 7/1992 |
| CN | 1463955 | 12/2003 |
| CN | 101519324 | 9/2009 |
| CN | 101798240 | 8/2010 |
| CN | 102167650 | 8/2011 |
| CN | 103086781 | 5/2013 |
| CN | 103086810 | 5/2015 |
| CN | 104768901 | 7/2015 |
| CN | 108349827 | 7/2018 |
| CN | 108530175 | 9/2018 |
| DE | 3816570 | 11/1989 |
| DE | 29809124 | 9/1999 |
| EP | 0988105 | 3/2000 |
| EP | 2774907 | 9/2014 |
| EP | 3372576 | 9/2018 |
| EP | 3374332 | 9/2018 |
| EP | 3419953 | 1/2019 |
| EP | 3436416 | 2/2019 |
| EP | 3571174 | 11/2019 |
| FR | 2676730 | 11/1992 |
| FR | 2684372 | 6/1993 |
| FR | 2745564 | 9/1997 |
| GB | 159854 | 12/1921 |
| GB | 492387 | 9/1938 |
| GB | 624642 | 6/1949 |
| GB | 822939 | 11/1959 |
| GB | 1189398 | 4/1970 |
| IL | 133429 | 12/1999 |
| KR | 2003062520 | 7/2003 |
| PL | 206964 | 10/2010 |
| RO | 111183 | 7/1996 |
| SU | 1063800 | 12/1983 |
| WO | WO 1998/055213 | 12/1998 |
| WO | WO 2000/000452 | 1/2000 |
| WO | WO 2001/021556 | 3/2001 |
| WO | WO 2001/042172 | 6/2001 |
| WO | WO 2004/000759 | 12/2003 |
| WO | WO 2017/081183 | 5/2017 |
| WO | WO 2018/162533 | 9/2018 |
| WO | WO 2019/016761 | 1/2019 |
| WO | WO 2019/016763 | 1/2019 |
| WO | WO 2019/215271 | 11/2019 |
| WO | WO 2020/104916 | 5/2020 |

OTHER PUBLICATIONS

Akhavan-Kharazian et al., "Effects of CaSO4, CaCl2, and NaCl on leaf nitrogen, nodule weight, and acetylene reduction activity in Phaseolus vulgaris L.," *Arid Soil Research and. Rehabilitation.*, 1991, 5(2):97-103.

Aldrich et al., "Gypsum and other sulfur materials for soil conditioning," *California Agricultural Experiment Station Publications*, 1951, Circular No. 403.

Alva et al., "Role of calcium in amelioration of copper phytotoxicity for citrus," *Soil Science*, 1993, 155:211-218.

Bayrakli "Ammonia volatilization losses from different fertilizers and effect of several urease inhibitors, CaCl2 and phosphogypsum on losses from urea," *Fertilizer Research*, 1990, 23(3):147-150.

Borowik et al., "Production technology of nitrogen-sulphur-calcium fertilizers on the base of urea and phosphogypsum," *CHEMIK*, 2012, 66(5):525-534.

Burt et al. "Flue-gas desulfurization gypsum effects on urea-degrading bacteria and ammonia volatilization from broiler litter." *Poultry Science*, 2017, 96(8):2676-2683.

De Villiers, et al. "Crystal structure of calcium sulfate-urea complex," *Journal of Crystal and Molecular Structure*, 1975; 5(4):215-226.

Dhiman, "Lecture 20 Single Superphosphate," Department of Chemical EngineeringIIT Roorkee, 2012, https://nptel.ac.in/courses//103/107/103107086/.

Epstein, "The essential role of calcium in selective cation transport by plant cells," *Plant Physiology*, 1961, 36(4):437-444.

Evangelou et al., "Mechanisms of "basic metals"—ammonia interactions: Field implications," *Agronomy Abstracts*, 1999, 199.

Fenn et al., "Calcium stimulation of ammonium absorption in onion," *Agronomy Journal*, 1991, 83:840-843.

Fenn et al., "Influence of plant age on calcium stimulated ammonium absorption by radish and onion." *Journal of Plant Nutrition*, 1993, 16(7):1161-1177.

Firsova, "Strength of Granules Based on Calcium Sulfate Crystal Solvates," *Moscow University Chemistry Bulletin*, 2010, 65(4):274-278.

Frazier, et al., "Urea-Monocalcium Phosphate, a Component of Mixed Fertilizers," *Journal of Agriculture and Food Chemistry*, 1967, 15(2):345-347.

Hakeem, et al., "Reactive Nitrogen Inflows and Nitrogen use Efficiency in Agriculture: An Environment Perspective," *Environmental Adaptions and Stress Tolerance of Plants in the Era of Climate Change*, 2012, 10:217-232.

International Search Report and Written Opinion issued in International Patent Application No. PCT/IB2018/055397, dated Oct. 9, 2018.

International Search Report and Written Opinion issued in International Patent Application No. PCT/IB2018/055399, dated Oct. 12, 2018.

Jones, "Ammonia Volatilization: Process, Amounts, and Effects on Yield and Protein" *Montana State University College of Agriculture & Montana Agricultural Experiment Station*, Created for the Web, 2017.

Jones, et al., "Critical Ca Levels and Ca/Mg rations in Trifolium subterraneum L. grown on serpentine sofl-.," *Agron. J.*, 1976, 68:756-759.

Khan et al., "Comparative effects of urea plus gypsum and urea plus ammonium sulphate on growth, yield and nutrition in canola cropping system in calcarosol of south-eastern Australia," *Proceedings of the 5th Joint Australian and New Zealand Soil Science Conference: Soil solutions for diverse landscapes*, 2012, 480.

Kirkby, "Maximizing calcium uptake by plants," *Communications in Soil Science and Plant Analysis*, 1979, 10(1-2):89-113.

Kotula, et al., "Czteromocznikan siarczanu wapnia-nawóz azotowo-siarkowo-wapniowy jako alter-natywa utylizacji fosfogipsu," *Prace Naukowe Politechniki Szczecinskiej*, 1998, 547, 91-96. (English Abstract Only).

Malinowski et al., "Preparation methods of calcium sulphate and urea adduct," *Polish Journal of Chemical Technology*, 2007, 9(4):111-114.

Muneer, et al., "The role of calcium-organic interactions in soil aggregate stability .III . . . Mechanisms and models," *Australian Journal of Soil Research.*, 1989, 27:411-423.

Oenema et al., "Ammonia volatilization from compound nitrogen-sulfur fertilizers." *Optimization of Plant Nutrients*, 1993:341-349.

Paroisse, "A new route for urea superphosphate fertilizers," *Phosphorous and Potassium*, 1994, 191, 27.

(56) References Cited

OTHER PUBLICATIONS

Podleśna, "Yielding Effect of Nitrogen and Sulfur At Pot Experiment Conditions With Winter Wheat," *Ecological Chemistry and Engineering A*, 2011, 18(3):401-405.

Prochnow et al., "Controlling ammonia losses during manure composting with the addition of phosphogypsum and simple superphosphate." *Sci. agric. (Piracicaba, Brazil)*, 1995; 52(2):346-349.

Ridzwan et al., "Comparative performance of different urea coating materials for slow release" *Particuology*, 2014, 17:165-172.

Scott, et al., "Application of calcium to soil and cultivar affect elemental concentration of watermelon leaf and rind tissue," *Journal of the American Society for Horticultural Science*, 1993, 118(2):201-206.

Shainberg, et al., "Use of gypsum on soils: A review," *Advances in Soil Science*, 1989, 9:1.

Sharma et al. "Ammonia Volatilization as Influenced by Amendments in a Light Textured Alkali Soil" *Annals of Arid Zone 33*, 1991; 3:203-207.

Smyth, et al., "Aluminum and calcium constraints to continuous crop production in a Brazilian Amazon Oxisol.," *Agronomy Journal*, 1992, 84:843-850.

Vashishtha, et al., "Improvement in properties of urea by phosphogypsum coating," *International Journal of ChemTech Research*, 2010, 2(1):36-44.

Whittaker, et al., "Reaction between Urea and Gypsum," *Industrial and Engineering Chemistry*, 1933, 25(11):1280-1282.

Zia et al., "Ammonia volatilization from nitrogen fertilizers with and without gypsum." *Soil Use and Management*, 1999, 15: 133-135.

International Search Report and Written Opinion issued in Corresponding PCT Application No. PCT/IB2021/055807, dated Oct. 28, 2021.

Office Action issued in Corresponding Chinese Application No. 201880058201.3, dated Aug. 27, 2021 (English Translation provided).

Office Action and Search Report issued in Corresponding Chinese Application No. 201980086833.5, dated Jan. 11, 2022 (English Translation provided).

\* cited by examiner

CALCIUM SULFATE UREA GRANULES AND METHODS FOR PRODUCING AND USING THE SAME

CROSS REFERENCE TO RELATED APPLICATIONS

This application is a national phase application under 35 U.S.C. § 371 of International Application No. PCT/IB2018/055397, filed Jul. 19, 2018, which claims the benefit and priority of India Patent Application No. 201711026033 filed Jul. 21, 2017 and U.S. Provisional Patent Application No. 62/626,932 filed Feb. 6, 2018, the entire contents of which applications are hereby incorporated by reference in their entirety.

BACKGROUND OF THE INVENTION

A. Field of the Invention

The invention generally concerns a calcium sulfate urea (UCS) fertilizer granule that includes one or more calcium sulfate urea adducts. A portion of the surface of at least one calcium sulfate urea adduct can include a layer that can have urea, calcium sulfate, calcium urea sulfate adduct, or any combination or all thereof.

B. Description of Related Art

Soil nutrients, such as nitrogen, phosphorus, potassium, and sulfur, as well as trace elements such as iron, zinc, copper, and magnesium, are useful for achieving thriving agriculture and growth of plants. However, upon repeated planting cycles, the quantity of these nutrients in the soil may be depleted as plants utilize the nutrients. Depletion of nutrient levels in the soil can result in inhibited plant growth and decreased production per acre. To counter this effect, fertilizers have been developed to help replace the depleted vital nutrients in soil so that optimal plant growth and high yields may be obtained. Fertilizers containing nitrogen are used to support healthy plant growth and photosynthesis. Urea ($CH_4N_2O$) is a compound that contains nitrogen and is widely used as a nitrogen source in fertilizers. However, due to its rapid hydrolysis and nitrification in the soil, nitrogen from urea can be quickly lost.

Mixing of fertilizer ingredients (e.g., urea, potassium compounds, calcium compounds, phosphorous compounds) can result in the production of fertilizers having an infinite number of ratios in regard to their content of primary nutrients. Bulk blending, is however, only a practical proposition as long as the fertilizer materials used in the preparation of the bulk blended fertilizer are well granulated and have not only a close, but also a very similar, granule size distribution. It is difficult to achieve the formation of granules of urea and other components within very narrow size ranges in a practical manner in conventional granulation devices, such as a rotating drum or pan, or a blunger. These factors influence on the physical quality of blended fertilizers. By way of example, Malinowski et al. (*Polish Journal of Chemical Technology*, 2007, Vol. 9, 4, 111-114) discusses preparation of calcium sulfate urea adducts by grinding, compaction, and screw granulation. However, this process is energy and time intensive and does not lend itself to commercial scaleability.

Although various fertilizers and methods to produce fertilizers are known, there is still a need for stable fertilizers that that can be made on a commercial scale.

SUMMARY OF THE INVENTION

A discovery has been made that addresses some of the problems associated with urea-based fertilizers. The discovery is premised on a calcium sulfate urea (UCS) granule that includes a calcium sulfate and urea adduct with at least a portion of its surface having a layer of urea, calcium sulfate, additional calcium sulfate urea adduct, or any combination thereof or all thereof. In some preferred instances, the UCS granule can be a 27-0-0-based fertilizer or a 33-0-0-based fertilizer and be stable under wet conditions. Notably, the granule has sufficient density that can allow it to sink in aqueous compositions. This can be beneficial in instances where crops are at least partially or fully submerged under water (e.g., rice paddies), and application of the granules of the present invention to such crops results in sinking of the granules in the water to contact the ground. This can result in a more homogenous distribution of the granules to the ground as compared to less dense granules that may coalesce at the water surface.

In one aspect of the invention, UCS fertilizer granules are described. The UCS fertilizer granule can include a calcium sulfate urea adduct, wherein a portion of the surface of the calcium sulfate urea adduct can include a layer having urea, calcium sulfate, or additional calcium sulfate urea adduct, or any combination thereof or all thereof. By way of example the layer can be formed on at least a portion of the outer surface of the calcium urea adduct, and the layer can include: (1) urea; (2) calcium sulfate; (3) additional calcium sulfate urea adduct; (4) urea and calcium sulfate; (5) urea and additional calcium sulfate urea adduct; (6) calcium sulfate and additional calcium sulfate urea adduct; or (7) urea, calcium sulfate, and additional calcium sulfate urea adduct. The layer can self-form or self-assemble during the production process of the UCS granule. The urea, calcium sulfate, and/or calcium sulfate urea adduct in the layer can be in particulate form. The calcium sulfate urea adduct can be $CaSO_4 \cdot 4CO(NH_2)_2$. Up to 30 wt. % of the urea in the granule can be comprised in the calcium sulfate urea adduct. Alternatively, at least 30 wt. % of the urea in the granule can be comprised in the calcium sulfate urea adduct. In some embodiments, the granule can include 25 wt. % to 35 wt. % elemental nitrogen, 4.5 wt. % to 15 wt. % elemental calcium, and 4 wt. % to 12 wt. % elemental sulfur. In one instance, the granule can include 26.5 to 27.5 wt. % elemental nitrogen, about 8.5 to 10.5 wt. % elemental calcium, and 6.5 to 8.5 wt. % sulfur. In another instance, the granule can include 32.5 wt. % to 33.5 wt. % elemental nitrogen, 4.5 wt. % to 5.5 wt. % elemental calcium, 4.5 wt. % to 5.5 wt. % elemental sulfur. The free-moisture content of the granule can be less than 1 wt. %, preferably less than 0.8 wt. %, less than 0.5 wt. % water or 0.25 wt. % to 0.7 wt. % water. In some instances, the granule does not include phosphorus, potassium, or both. The granule can have a density greater than water (e.g., greater than 1.0 g/mL). The granule can be comprised of one or more particles. A first portion of the particles can be the calcium sulfate urea adduct, and a second portion of the particles can form the layer that covers at least a portion of the calcium sulfate urea adduct. In certain non-limiting aspects, the first portion of the particles can have an average particle size of 1 up to 15 micrometers, and the second portion of the particles can have an average particle size of 15 to 900 micrometers. The layer can be made up of particles of urea, particles of calcium sulfate, and/or particles of calcium sulfate urea adduct, or any combination or all thereof. In some embodiments, the smaller and larger particles can be elongated particles or can be substantially spherical particles or other shapes, or combinations of such shapes. The UCS granules can have a crush strength of 1 kg/granule to 10 kg/granule or more, preferably 2 kg/granule to 5 kg/granule. The layer can self-assemble during the manufacture of the granule. The fertilizer granules of the present invention can be acidic. In some particular aspects, the granules can have a pH of 3 to 6, preferably 4 to 5 when mixed with water. Also, the granules of the present invention can have an average size of 1 millimeter (mm) to 5 mm, preferably about 2 mm to 4 mm.

In another aspect of the invention, processes to produce the UCS fertilizer granules of the present invention are described. A process can include (a) combining urea, hydrated or anhydrous calcium sulfate, and water (preferably in the form of steam) under conditions sufficient to form an aqueous solution comprising water, urea, and calcium sulfate, where the urea is solubilized in the aqueous solution, (b) mixing the aqueous solution under conditions sufficient to produce a wet fertilizer granule that can include a calcium sulfate urea adduct and water, and (c) removing at least a portion of the water from the wet fertilizer granule to form the calcium sulfate urea granule. The urea can be partially or fully solubilized in the aqueous solution. The urea used in step (a) can be in the form of prills, particles, or a solution having urea dissolved therein. Step (a) conditions can include a temperature of 85° C. to 120° C. The wet fertilizer granule in step (b) can include a sufficient amount of water such that the composition is formable (e.g., can be formed into a desired shape, such as a sphere or ball when compressed by hand). The water can be removed from the wet fertilizer at temperature of 80° C. to 100° C., preferably 85° C. to 95° C. or 85° C. to 90° C. or any range or value there between. In some embodiments, at least 25% or at least 30% of the urea from step (a) can be converted into the calcium sulfate urea adduct. In some embodiments, additional calcium sulfate, recycled UCS granules (i.e., granules produced from the process), and/or water can be provided to step (a) and/or (b). Without wishing to be bound by theory, it is believed that solubilizing the urea in the water allows mixing with the calcium sulfate such that the urea replaces water associated with the calcium sulfate to form the calcium sulfate urea adduct. Also without wishing to be bound by theory, it is believed that the layer surrounding at least a portion of the formed calcium sulfate urea adduct self-assembles during this production process of the granule.

In yet another aspect of the present invention, methods of fertilizing are described. A method can include applying a plurality of calcium sulfate urea fertilizer granules of the present invention to a portion of a soil, a crop, or a combination of the soil and the crop. In some embodiments, the soil is at least partially or fully submerged under water (e.g., rice paddy crops) and the granules sink in the water to contact the soil. This can allow for homogenous distribution of the granules to the soil rather than having the granules coalesce together in or on the surface of the water.

Also disclosed in the context of the present invention are blended fertilizer compositions that can include a plurality of UCS granules of the present invention mixed with other fertilizes that are in particulate form (e.g., urea, monoammonium phosphate (MAP), diammonium phosphate (DAP), muriate of potash (MOP), and/or sulfate of potash (SOP)). Preferably, the UCS granules and additional particulate fertilizers are compatible with each other (e.g., can contact each other without having a chemical reaction take place).

Also disclosed are the following Embodiments 1 to 16 of the present invention. Embodiment 1 is a calcium sulfate urea (UCS) fertilizer granule comprising urea, calcium sulfate, and a calcium sulfate urea adduct, wherein a portion of the surface of the calcium sulfate urea adduct includes a layer comprising urea, calcium sulfate, or calcium sulfate urea adduct, or any combination or all thereof. Embodiment 2 is the UCS fertilizer granule of Embodiment 1, wherein at least 30 wt. % of the urea in the granule is comprised in the calcium sulfate urea adduct. Embodiment 3 is the UCS fertilizer granule of any one of Embodiments 1 to 2, wherein the granule comprises 20 wt. % to 44 wt. % elemental nitrogen, preferably 25-35 wt. % elemental nitrogen, 4.5 wt. % to 15 wt. % elemental calcium, and 4 wt. % to 12 wt. % elemental sulfur. Embodiment 4 is the UCS fertilizer granule of Embodiment 3, wherein the composition comprises 26.5 to 27.5 wt. % elemental nitrogen, about 8.5 to 10.5 wt. % elemental calcium, and 6.5 to 8.5 wt. % elemental sulfur. Embodiment 5 is the UCS fertilizer granule of Embodiment 3, wherein composition comprises 32.5 wt. % to 33.5 wt. % elemental nitrogen, 4.5 wt. % to 5.5 wt. % elemental calcium, 4.5 wt. % to 5.5 wt. % elemental sulfur. Embodiment 6 is the UCS fertilizer granule of any one of Embodiments 1 to 5, further comprising less than 1 wt. % free moisture, preferably less than 0.8 wt. % free moisture, less than 0.5 wt. % free moisture or 0.25 wt. % to 0.7 wt. % free moisture. Embodiment 7 is the UCS fertilizer granule of any one of Embodiments 1 to 6, wherein the adduct is $CaSO_4.4CO(NH)_2$. Embodiment 8 is the UCS fertilizer granule of any one of Embodiments 1 to 7, having a crush strength of 2 kg/granule to 5 kg/granule. Embodiment 9 is the UCS fertilizer granule of any one of Embodiments 1 to 8, wherein the granule comprises calcium sulfate urea adduct particles, urea particles, and calcium sulfate particles. Embodiment 10 is a process to prepare a calcium sulfate urea fertilizer granule of any one of Embodiments 1 to 9, the process comprising: combining urea, hydrated or anhydrous calcium sulfate, and steam under conditions sufficient to form an aqueous solution comprising water, urea, and calcium sulfate, wherein the urea is solubilized in the aqueous solution; mixing the aqueous solution under conditions sufficient to produce a wet fertilizer granule comprising a calcium sulfate urea adduct and water; and removing at least a portion of the water from the wet fertilizer granule to form the calcium sulfate urea granule. Embodiment 11 is the process of Embodiment 10, wherein the step (a) conditions comprise a temperature of 85° C. to 120° C. Embodiment 12 is the process of any one of Embodiments 10 to 11, wherein the wet fertilizer granule in step (b) includes a sufficient amount of water such that the composition is formable. Embodiment 13 is the process of any one of Embodiments 10 to 12, wherein step (c) comprises a temperature of 80° C. up to 100° C., preferably 85° C. to 90° C. Embodiment 14 is the process of any one of Embodiments 10 to 13, wherein at least 30% of the urea from step (a) is converted to the calcium sulfate urea adduct. Embodiment 15 is a method of fertilizing, the method comprising applying a plurality of calcium sulfate urea granules of any one of Embodiments 1 to 9 to a portion of the soil, a crop, or the soil and the crop. Embodiment 16 is the method of Embodiment 15, wherein soil is submerged under water, preferably a rice paddy, and the granules sink in the water to contact the soil.

The following includes definitions of various terms and phrases used throughout this specification.

The term "fertilizer" is defined as a material applied to soils or to plant tissues to supply one or more plant nutrients essential or beneficial to the growth of plants and/or stimulants or enhancers to increase or enhance plant growth. Non-limiting examples of fertilizers include materials having one or more of urea, ammonium nitrate, calcium ammonium nitrate, one or more superphosphates, binary nitrogen phosphorous (NP) fertilizers, binary nitrogen potassium (NK) fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer, such as, but not limited to biostimulants, urease inhibitors, and nitrification inhibitors. In some particular instances, the fertilizer is urea.

The term "granule" can include a solid material. A granule can have a variety of different shapes, non-limiting examples of which include a spherical, a puck, an oval, a rod, an oblong, or a random shape.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "free moisture content," as the term used in this specification and/or claims means the water or moisture not associated with calcium sulfate dehydrate or monohydrate. This term means any other free water or moisture.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The UCS fertilizer granules of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the UCS fertilizer granules of the present invention is the presence of a stable calcium sulfate urea adduct having a layer comprising urea, calcium sulfate, or additional calcium sulfate urea adduct, or any combination thereof or all thereof. Further, the UCS fertilizer granules can have a density greater than water.

BRIEF DESCRIPTION OF THE DRAWINGS

Advantages of the present invention may become apparent to those skilled in the art with the benefit of the following detailed description and upon reference to the accompanying drawings.

Figure 1A:
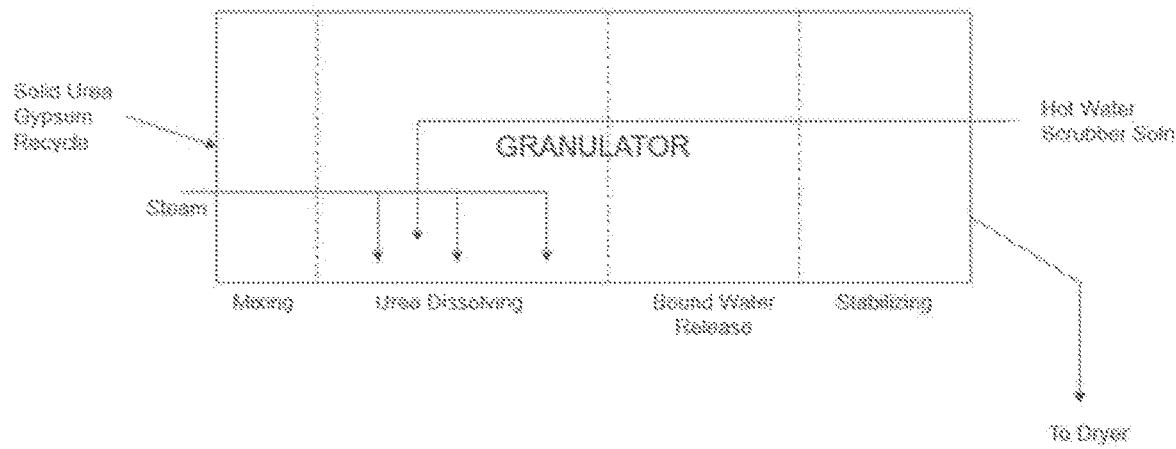
FIG. 1A is a schematic of a system that can be used to produce UCS fertilizer granules of the present invention in which solid urea can be used as a starting material and FIG. 1B is a schematic of a system that can be used where urea solution or urea melt can be used as a starting material.

While the invention is susceptible to various modifications and alternative forms, specific embodiments thereof are shown by way of example in the drawings. The drawings may not be to scale.

DETAILED DESCRIPTION OF THE INVENTION

The calcium sulfate urea (UCS) granule of the present invention can include a calcium sulfate urea adduct formed from the following exemplary reaction:

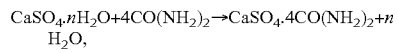
$$CaSO_4 \cdot nH_2O + 4CO(NH_2)_2 \rightarrow CaSO_4 \cdot 4CO(NH_2)_2 + nH_2O,$$

where: n is between 0 and 2 (e.g., n=0, 0.5, 1, 1.5 or 2) or any value or range there between. Non-stoichiometric amounts of urea can also be used, such as 2 to 6 moles of urea to each mole of $CaSO_4$. The adduct can also include a layer that has urea, calcium sulfate, or additional calcium sulfate urea adduct, or a combination thereof or all thereof. The layer can be particles of urea, calcium sulfate, or additional calcium sulfate urea adduct. Also, and without wishing to be bound by theory, it is believed that the layer self-assembles during the manufacture of the granule. In some preferred instances, the UCS granule can be a 27-0-0+7% S+10% Ca granule that can be preferably made from approximately 60% urea and 40% natural gypsum. In other instances, the UCS granule can be a 33-0-0+5% S+5% Ca granule that can be preferably made from approximately 72% urea and 28% natural gypsum. The UCS granules of the present invention can have a density that is greater than water, thereby allowing the granules to sink in water. This can be beneficial in instances where application of the granules to crops that are partially or fully submerged in water is desired (e.g., fertilizer a rice paddy). This density feature of the granules can allow the granules to sink in the water to contact the soil, which can result in a more homogenous distribution of the granules to the soil rather than coalescence of the granules in or on the surface of the water. In particularly preferred embodiments, fertilizer compositions comprising a plurality of granules of the present invention are in a dry form and are not in a slurry form.

Some non-limiting benefits of the UCS granules of the present invention is that they can be a good acidifier, which can contribute to efficient nutrient distribution to the soil and/or plants. Even further, the granules can increase nutrient uptake by the plants due, at least in part, to these acidic feature. It is also believed that the contents and/or structure of the granules of the present invention can aid in reducing nitrogen volatilization.

These and other non-limiting aspects of the present invention are discussed in further detail in the following sections.

A. Process to Produce UCS Fertilizer Granules

Figure 1B:
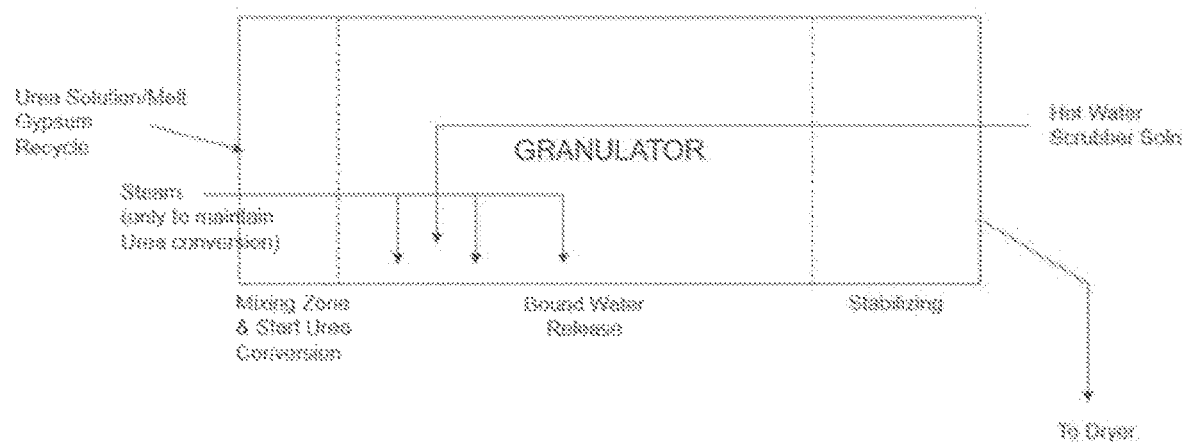

The UCS granules of the present invention can be made using a granulation system shown in FIG. 1A or 1B. The granulation system can include first zone (mixing zone). In the mixing zone, solid urea (e.g., fresh urea prills) (FIG. 1A)

and calcium sulfate dihydrate (e.g., gypsum) can be thoroughly mixed on a rolling bed (e.g., a conveyor). By way of example, a granulator speed of 5 to 10 rpm or about 6 rpm can be used to promote mixing along the length of the granulator. Additionally or alternatively, urea solution and/or urea melt (FIG. 1B) can be used, and can be introduced to the mixing zone. Anhydrous calcium sulfate, calcium sulfate monohydrate, and/or calcium sulfate hemihydrate can also be used alone or in combination with calcium sulfate dihydrate. These calcium sulfates with varying degrees on hydration can then be converted to calcium sulfate dihydrate suitable for the UCS adduct formation.

The mixture of urea and calcium sulfate dihydrate can enter the urea dissolving zone (FIG. 1A). In other instances, however, a urea dissolving zone is not used (FIG. 1B). Steam can be injected below the rolling bed. The use of steam provides water for the dissolution of urea and energy (e.g., heat) within the urea-dissolving zone as urea dissolution is an endothermic process. The use of steam can inhibit absorption of heat from the surroundings and hence lowering the reaction temperature in the dissolving zone without additional energy. With steam injection below the bed, the urea can be rapidly dissolved while the surrounding material can be maintained at the high temperature, which can preferably be about 80° C. to 100° C. or any value or range there between (e.g., 80, 85, 90, 95 or 100° C.). Without wishing to be bound by theory, it is believed that the urea should be in solution (partially or fully solubilized) to exchange urea for water in the calcium sulfate dihydrate composition so as to form the urea calcium sulfate adduct.

The urea solution exits the urea-dissolving zone and enters the bound water release zone (third zone). In the third zone to produce the UCS granules of the present invention, the urea solution can be mixed with unreacted or additional calcium sulfate and/or optional calcium sulfate urea recycled from rejected material made by this or another process. As calcium sulfate urea is produced, bound water within the calcium sulfate is released, further promoting the conversion to calcium sulfate urea adduct. The temperature of the bound water release zone can be 80° C. to 100° C., preferably 85° C. to 95° C.

The UCS granules can exit the bound water release zone and enter the stabilizing zone where mixing of the mixture of urea, calcium sulfate, and water is continued. In some embodiments, calcium sulfate urea recycle can be added to any one of the zones to help maintain consistency of the mixture.

The conditions of the material exiting the granulator can be a semi-wet granule, which easily forms "balls when compresses with the hands." If the material is too dry, then granulation is decreased leading to smaller product fraction in the material exiting the dryer. If the material is too "wet" (tending towards mud) then there is a risk that the UCS "mud" will stick to the surfaces of the dryer, leading to building up on the dryer surface.

The material can exit the granulator and enters a rotating dryer. The granulation process continues along the dryer length and free moisture can be removed from the product. Observations of the material entering and exiting the rotary dryer confirmed that granulation and urea adduct conversion continues within the dryer. Operating conditions of the dryer were found to be highly significant to achieve the desired level of drying while promoting urea adduct conversion. The operating temperature of the dryer can also be used to adjust the temperature at which the UCS recycle materials re-enters the granulation system. Continuous operation can be achieved with dryer exit temperatures (as measured by the exit gas) between 80° C. to 90° C., preferably 85° C. to 88° C. If the exit temperature rises above 90° C. to 95° C., the composition may melt creating a molten mass inside the drier.

B. Blended Fertilizer Compositions

The UCS granules of the present invention can also be included in a blended composition comprising other fertilizers, such as other fertilizer granules. Additional fertilizers can be chosen based on the particular needs of certain types of soil, climate, or other growing conditions to maximize the efficacy of the UCS granules in enhancing plant growth and crop yield. The other fertilizer granules can be granules of urea, single super phosphate (SSP), triple super phosphate (TSP), ammonium sulfate, monoammonium phosphate (MAP), diammonium phosphate (DAP), muriate of potash (MOP), and/or sulfate of potash (SOP), and the like.

C. Method of Using the UCS Fertilizer Granules

The UCS fertilizer granules of the present invention can be used in methods of increasing the amount of nitrogen in soil and of enhancing plant growth. Such methods can include applying to the soil an effective amount of a composition comprising the UCS fertilizer granule of the present invention. The method may include increasing the growth and yield of crops, trees, ornamentals, etc. such as, for example, palm, coconut, rice, wheat, corn, barley, oats, and soybeans. The method can include applying UCS fertilizer granules of the present invention to at least one of a soil, an organism, a liquid carrier, a liquid solvent, etc.

Non-limiting examples of plants that can benefit from the fertilizer of the present invention include vines, trees, shrubs, stalked plants, ferns, etc. The plants may include orchard crops, vines, ornamental plants, food crops, timber, and harvested plants. The plants may include Gymnosperms, Angiosperms, and/or Pteridophytes. The Gymnosperms may include plants from the Araucariaceae, Cupressaceae, Pinaceae, Podocarpaceae, Sciadopitaceae, Taxaceae, Cycadaceae, and Ginkgoaceae families. The Angiosperms may include plants from the Aceraceae, Agavaceae, Anacardiaceae, Annonaceae, Apocynaceae, Aquifoliaceae, Araliaceae, Arecaceae, Asphodelaceae, Asteraceae, Berberidaceae, Betulaceae, Bignoniaceae, Bombacaceae, Boraginaceae, Burseraceae, Buxaceae, Canellaceae, Cannabaceae, Capparidaceae, Caprifoliaceae, Caricaceae, Casuarinaceae, Celastraceae, Cercidiphyllaceae, Chrysobalanaceae, Clusiaceae, Combretaceae, Cornaceae, Cyrillaceae, Davidsoniaceae, Ebenaceae, Elaeagnaceae, Ericaceae, Euphorbiaceae, Fabaceae, Fagaceae, Grossulariaceae, Hamamelidaceae, Hippocastanaceae, Illiciaceae, Juglandaceae, Lauraceae, Lecythidaceae, Lythraceae, Magnoliaceae, Malpighiaceae, Malvaceae, Melastomataceae, Meliaceae, Moraceae, Moringaceae, Muntingiaceae, Myoporaceae, Myricaceae, Myrsinaceae, Myrtaceae, Nothofagaceae, Nyctaginaceae, Nyssaceae, Olacaceae, Oleaceae, Oxalidaceae, Pandanaceae, Papaveraceae, Phyllanthaceae, Pittosporaceae, Platanaceae, Poaceae, Polygonaceae, Proteaceae, Punicaceae, Rhamnaceae, Rhizophoraceae, Rosaceae, Rubiaceae, Rutaceae, Salicaceae, Sapindaceae, Sapotaceae, Simaroubaceae, Solanaceae, Staphyleaceae, Sterculiaceae, Strelitziaceae, Styracaceae, Surianaceae, Symplocaceae, Tamaricaceae, Theaceae, Theophrastaceae, Thymelaeaceae, Tiliaceae, Ulmaceae, Verbenaceae, and/or Vitaceae family.

The effectiveness of compositions that include the UCS fertilizer granules of the present invention can be ascertained by measuring the amount of nitrogen in the soil at various times after applying the fertilizer composition to the soil. It is understood that different soils have different characteristics, which can affect the stability of the nitrogen in the soil. The effectiveness of a fertilizer composition can also be directly compared to other fertilizer compositions by doing a side-by-side comparison in the same soil under the same conditions.

As discussed above, one of the unique aspects of the UCS fertilizer granules of the present invention is that they can have a density that is greater than water. This can allow the granules to sink in water rather than float in water. This can be especially beneficial in instances where application is intended to a crop that is at least partially or fully submerged in water. A non-limiting example of such a crop is rice, as the ground in a rice paddy is typically submerged in water. Thus, application of UCS granules to such crops can be performed such that the granules are homogenously distributed on the ground that is submerged under water. By comparison, granules that have a density that is less than water would have a tendency to remain in or on the water surface, which could result in washing away of the granules and/or coalescence of the granules, either of which would not achieve homogenous distribution of the granules to the ground that is submerged under water.

D. Compositions

The UCS fertilizer granule can include a calcium sulfate urea adduct. The calcium sulfate urea adduct can be $CaSO_4 \cdot 4CO(NH)_2$. Up to 30 wt. % of the urea in the granule can be comprised in the calcium sulfate urea adduct. Alternatively, at least 30 wt. % of the urea in the granule can be comprised in the calcium sulfate urea adduct. 0, 5, 10, 15, 20, 25, 30, 35, 40, 45, 50, 55, 60, 65, 70, 75, 80, 85, 90, 95, 100 wt. %, or any amount there between, of the urea in the granule can be comprised in the calcium sulfate urea adduct. In some embodiments, the granule can include 25, 26, 27, 28, 29, 30, 31, 32, 33, 34, or 35 wt. % elemental nitrogen, 4.5, 5, 6, 7, 8, 9, 10, 11, 12, 13, 14, or 15 wt. % elemental calcium, and 4, 5, 6, 7, 8, 9, 10, 11, or 12 wt. % elemental sulfur. In one instance, the granule can include about 26.5, 27, or 27.5 wt. % elemental nitrogen, about 8.5, 9, 9.5, 10, or 10.5 wt. % elemental calcium, and 6.5, 7, 7.5, 8, or 8.5 wt. % sulfur. In another instance, the granule can include 32.5, 33, or 33.5 wt. % elemental nitrogen, 4.5, 5, or 5.5 wt. % elemental calcium, 4.5, 5, or 5.5 wt. % elemental sulfur. The free-moisture content of the granule can be less than 1 wt. %, preferably less than 0.8 wt. %, less than 0.5 wt. % water or 0.25 wt. % to 0.7 wt. % water. In some instances, the free moisture content is 1, 0.9, 0.8, 0.7, 0.6, 0.5, 0.4, 0.3, 0.2, 0.1, or 0 wt. %. In some instances, the granule does not include phosphorus, potassium, or both. The granule can have a density greater than water (e.g., greater than 1.0 g/mL). In some instances the density is 1, 1.5, 2, 2.5, 3, 3.5, 4, 4.5, 5, 5.5, 6, 6.5 g/mL, or greater.

The UCS fertilizer granule can include a calcium sulfate urea adduct, wherein a portion of the surface of the calcium sulfate urea adduct can include a layer containing (1) urea; (2) calcium sulfate; (3) additional calcium sulfate urea adduct; (4) urea and calcium sulfate; (5) urea and additional calcium sulfate urea adduct; (6) calcium sulfate and additional calcium sulfate urea adduct; and/or (7) urea, calcium sulfate, and additional calcium sulfate urea adduct. The layer can self-form or self-assemble during the production process of the UCS granule. The urea, calcium sulfate, and/or calcium sulfate urea adduct in the layer can be in particulate form.

The granule can be comprised of one or more particles. A first portion of the particles can be the calcium sulfate urea adduct, and a second portion of the particles can form a layer that covers at least a portion of the calcium sulfate urea adduct. In certain non-limiting aspects, the first portion of the particles can have an average particle size of 1, 2, 3, 4, 5, 6, 7, 8, 9, 10, 11, 12, 13, 14, or 15 micrometers, and the second portion of the particles can have an average particle size of 15, 20, 30, 40, 50, 60, 70, 80, 90, 100, 200, 300, 400, 500, 600, 700, 800, or 900 micrometers or any size there between. The layer can be made up of particles of urea, particles of calcium sulfate, and/or particles of calcium sulfate urea adduct, or any combination, or all thereof. In some embodiments, the smaller and larger particles can be elongated particles or can be substantially spherical particles or other shapes, or combinations of such shapes. Non-limiting examples of shapes include a spherical, a puck, an oval, a rod, an oblong, or a random shape.

The UCS granules can have a crush strength of 1, 2, 3, 4, 5, 6, 7, 8, 9, 10 kg/granule, or more, or any amount there between, preferably 2 kg/granule to 5 kg/granule. The fertilizer granules of the present invention can be acidic. In some particular aspects, the granules can have a pH of 3, 3.5, 4, 4.5, 5, 5.5, or 6, preferably 4 to 5 when mixed with water. Also, the granules of the present invention can have an average size of 1, 1.5, 2, 2.5, 3, 3.5, 4, 4.5, or 5 mm, preferably about 2 mm to 4 mm.

The UCS granules can include other fertilizer actives and micronutrients. These could be added with urea and calcium sulfate at the beginning of the granulation process or at any later stage.

Additional additives can be, including without limitation, micronutrients, primary nutrients, and secondary nutrients. A micronutrient is a botanically acceptable form of an inorganic or organometallic compound such as boron, copper, iron, chloride, manganese, molybdenum, nickel, or zinc. A primary nutrient is a material that can deliver nitrogen, phosphorous, and/or potassium to a plant. Nitrogen-containing primary nutrients may include urea, ammonium nitrate, ammonium sulfate, diammonium phosphate, monoammonium phosphate, urea-formaldehyde, or combinations thereof. A secondary nutrient is a substance that can deliver calcium, magnesium, and/or sulfur to a plant. Secondary nutrients may include lime, gypsum, superphosphate, or a combination thereof. For example, in some instances, the UCS granule can contain calcium sulfate, potassium sulfate, magnesium sulfate or a combination thereof.

In one aspect, the UCS granules can include one or more inhibitors. The inhibitor can be a urease inhibitor or a nitrification inhibitor, or a combination thereof. In one aspect, UCS granule can include a urease inhibitor and a nitrification inhibitor. In one aspect, the inhibitor can be a urease inhibitor. Suitable urease inhibitors include, but are not limited to, N-(n-butyl) thiophosphoric triamide (NBTPT) and phenylphosphorodiamidate (PPDA). In one aspect, urease inhibitor can include NBTPT or PPDA, or a combination thereof. For example, the urease inhibitor can be selected from the group consisting of NBTPT and PPDA, or a combination thereof. In another aspect, the inhibitor can be a nitrification inhibitor. Suitable nitrification inhibitors can include, but are not limited to, 3,4-dimethylpyrazole phosphate (DMPP), dicyandiamide (DCD), thiourea (TU), 2-chloro-6-(trichloromethyl)-pyridine (Nitrapyrin), 5-ethoxy-3-trichloromethyl-1,2,4-thiadiazol (available under the trade name Terrazole®, OHP Inc., USA), 2-amino 4-chloro 6-methyl pyrimidine (AM), 2-mercaptobenzothiazole (MBT), or 2-sulfanilamidothiazole (ST), and any combination thereof. In one aspect, the UCS granule can include a urease inhibitor and a nitrification inhibitor. In one aspect, nitrification inhibitor can include DMPP, DCD, TU, nitrapyrin, 5-ethoxy-3-trichloromethyl-1,2,4-thiadiazol, AM, MBT or ST, or any combination thereof. For example, the nitrification inhibitor can be selected from the group consisting of DMPP, DCD, TU, nitrapyrin, 5-ethoxy-3-trichloromethyl-1,2,4-thiadiazol, AM, MBT and ST, or a combination thereof. In one aspect, the inhibitor can include NBTPT, DMPP, TU, DCD, PPDA, nitrapyrin, 5-ethoxy-3-trichloromethyl-1,2,4-thiadiazol, AM, MBT, or ST or a combination thereof. For example, the inhibitor can include NBTPT. In another example, the inhibitor can include DMPP. In yet another example, the inhibitor can include TU. In yet another example, the inhibitor can include DCD. In yet another example, the inhibitor can include PPDA. In yet another example, the inhibitor can include nitrapyrin. In yet another example, the inhibitor can comprise 5-ethoxy-3-trichloromethyl-1,2,4-thiadiazol or the commercial product Terrazole®. In yet another example, the inhibitor can include AM. In yet another example, the inhibitor can include MBT. In yet another example, the inhibitor can include ST. In yet another example, the inhibitor can include any combination of NBTPT, DMPP, TU, DCD, PPDA, nitrapyrin, 5-ethoxy-3-trichloromethyl-1,2,4-thiadiazol (e.g., Terrazole®), AM, MBT, and ST. For example, the inhibitor can include NBTPT and DCD. In yet another example, the inhibitor can include PPDA and DCD. In yet another example, the inhibitor can include NBTPT and DMPP. In some of the instances where the UCS granule includes at least one of a urease inhibitor and a nitrification inhibitors, the urease inhibitors can be selected from NBTPT, PPDA, and combinations thereof, and the nitrification inhibitor can be selected from DMPP, TU, DCD, nitrapyrin, Terrazole, AM, MBT, ST, and combinations thereof.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Lab Scale Process to Prepare UCS Fertilizer Granules

A lab scale process for making a UCS fertilizer granule of the present invention was performed by using the system described in FIGS. 1A and 1B and in Section A of the Detailed Description of the Invention.

A mixture of urea (58 g) and gypsum ($CaSO_4 \cdot 2H_2O$, 42 g) were added to hot water (15 g). The urea had a nitrogen content of 46 wt. %. The gypsum had a calcium content of about 24 wt. % and sulfur content of about 18 wt. %. The aqueous mixture was heated to about 90° C. and stirred constantly for 15 minutes. Samples of the mixture were taken and analyzed using the method described by Malinowski et al. (*Polish Journal of Chemical Technology,* 2007, Vol. 9, 4, 111-114) to determine the amount of unreacted urea. Repeat sample preparation at different reaction temperatures (90° C., 100° C., 110° C.) and different stirring (resident) times (10 & 15 minutes). Used prilled urea, grinded urea, melt urea, and 70 wt./wt. % urea solution. Tables 1, 2, and 3 include data on these lab scale experiments.

TABLE 1

(Sample Fabrication and Lab Results)
58% urea + 42% gypsum At 90° C. and 10 minute stirring time

| | | Lab Analysis Results (27:0:0 + 8S + 10Ca) | | | | |
|---|---|---|---|---|---|---|
| R. Material | Water 15% | % N (total) 27.0 | % Ca 10.0 | % S 8.0 | % Biuret >1.0 | Density g/ml |
| Prilled Urea + Gypsum | ✓ | 26.5 | 6.9 | 5.6 | — | 1.5 |
| Prilled Urea + Gypsum | ✓ | 27.1 | 6.8 | 5.6 | 2.5 | 1.53 |
| Prilled Urea + Gypsum | X (No water) | 26.3 | 8.4 | 8.0 | 2.6 | Dry |
| Prilled Urea + Gypsum | ✓ (added after 6 min) | 27.6 | 8.3 | 5.3 | 3.6 | 1.48 |
| Grinded Urea + Gypsum | X (No water) | 26.5 | 7.5 | 5.1 | 3.8 | Dry |
| Grinded Urea + Gypsum | ✓ (after 5 min) | 26.2 | 6.1 | 4.3 | 3.5 | 1.42 |
| Grinded Urea + Gypsum | ✓ | 26.1 | 6.7 | 5.0 | 3.6 | 1.48 |
| Grinded Urea + Gypsum | ✓ | 26.9 | 6.5 | 7.7 | — | 1.46 |
| Grinded Urea + Gypsum | ✓ (after 8 min) | 26.1 | 6.7 | 6.9 | — | 1.56 |

TABLE 2

(Sample Fabrication and Lab Results Continued)
58% urea + 42% gypsum At 90° C. and 10 minute stirring time

| | | Lab Analysis Results | | | | |
|---|---|---|---|---|---|---|
| R. Material | Water 15% | % N (total) 27.0 | % Ca 10.0 | % S 8.0 | % Bluret >1.0 | Density g/ml |
| Urea (70% Sol) + Gypsum | ✓ (83% water) | 6.8 | 12.6 | 14.0 | — | 1.16 |
| Urea (70% Sol) + Gypsum | ✓ (83% add after 5 min) | 8.8 | 12.3 | 11.3 | — | 1.20 |
| Urea Melt + Gypsum | X (No water) | 26.7 | 8.0 | 7.4 | 7.7 | Dry |
| Urea Melt + Gypsum | ✓ | 26.7 | 7.4 | 7.3 | 8.4 | 1.48 |
| Urea Melt + Gypsum | X (No water) | 27.3 | 6.7 | 5.4 | 5.52 | Dry |
| Urea (387% Sol) + Gypsum | ✓ (U first mix in 15% W) | | | | | 1.50 |
| Urea (387% Sol) + Gypsum | ✓ (U first mix in 15% W) | | | | | 1.50 |

TABLE 3

(Degree of Urea Conversion Results)
DEGREE OF UREA CONVERSION RESULTS

| Sample ID | Total area % | Urea adduct % | Degree of Urea Conversion, % |
|---|---|---|---|
| 1 (Prilled Urea + Gypsum) | 56.42 | 40.14 | 71.14 |
| 2 | 62.44 | 54.23 | 86.85 |
| 3 | 64.39 | 53.08 | 82.44 |
| 4 | 57.35 | 40.26 | 70.21 |
| 5 | 56.50 | 41.14 | 72.81 |
| 6 | 53.98 | 45.16 | 83.66 |
| 7 | 54.78 | 44.80 | 81.79 |
| 8 | 52.38 | 43.53 | 83.11 |
| 9 | 54.64 | 43.52 | 79.66 |
| 10 | — | — | — |
| 11 | — | — | — |

Conclusions about the lab scale process include: (1) temperature at which the urea conversion takes place was determined to be 75 to 100° C. Experiments based on slurry formation determined that a temperature of about 80° C. was optimal. Lab experiments showed little advantage in increasing the temperature to 110° C. and also no advantage to utilizing urea melt; (2) water content of the raw materials and the slurry mixture was determined to assist in the reaction that produced the adduct. Without wishing to be bound by theory, it was believed that water acted as the conversion "initiator," dissolving the urea and making it available to replace the hydration water within the gypsum. From the slurry experiments it was determined that a moisture content is 18 wt. % to 22 wt. % ensured both rapid conversion of the urea and maintained the slurry within an acceptable "pumpable" condition. From the drum granulation tests it was determined that a moisture content was preferably above 5 wt. % to observe urea conversion. However, the lab drum tests were unable to "maintain" the moisture conditions once started so it was likely that moisture was lost throughout the tests, thus slowing the rate of conversion; and (3) agitation promoted interaction between the urea (which rapidly dissolved to form a solution) and the gypsum.

Example 2

Full Scale Process to Prepare UCS Fertilizer Granules

A full scale manufacturing process for making a UCS fertilizer granule of the present invention was performed by using the system described in FIG. 1A (solid urea prills were used) and in Section A of the Detailed Description of the Invention.

Table 4 provides data on production of a 33% nitrogen UCS granule, and Table 5, provides data on production a 27% nitrogen UCS granule. These tables show analysis over time of the dried granule product in a continuous process where the dried granule product is continually recycled back through the process. Briefly, the reactants go into a reactor, through a granulator and a dryer, and then a screener to remove fines and oversized particles (e.g. less than 2 mm and greater than 4 mm), continuously. The products are recycled back through the process. An increase in the degree of conversion to adduct is demonstrated over time. Process condition changes may be the cause of the reduction of degree of conversion in the later analysis samples. It is expected that a conversion rate of 70-80% or more will be achieved by keeping the process conditions steady.

TABLE 4

(33% nitrogen UCS granule)

| Time from first sample taken (hours) | Moisture (%) | Ammonical Nitrogen (%) | Urea Nitrogen (%) | Calcium (%) | Sulfur (%) | Total Urea (%) | Adduct Urea (%) | Degree of Conversion (%) | Crush Strength (kgf/granule) |
|---|---|---|---|---|---|---|---|---|---|
| 0 | 0.31 | 15.11 | 4.80 | 5.01 | 5.21 | 10.29 | 3.37 | 32.75 | 5.10 |
| 2 | 0.38 | 6.48 | 29.80 | 5.85 | 6.11 | | | | 5.06 |
| 4 | 0.56 | 2.04 | 33.88 | 5.82 | 5.30 | 72.60 | 26.78 | 36.89 | 4.90 |
| 6 | 0.45 | 1.20 | 33.22 | 5.60 | 5.50 | | | | 5.27 |
| 8 | 0.56 | 1.45 | 33.85 | 5.70 | 5.16 | 70.39 | 24.81 | 35.25 | 5.20 |
| 10 | 0.60 | 1.08 | 35.20 | 5.45 | 4.89 | | | | 5.03 |
| 12 | 0.56 | 1.00 | 34.37 | 5.31 | 4.80 | 73.65 | 27.10 | 36.80 | 4.96 |

TABLE 5

(27% nitrogen UCS granule)

| Time from first sample taken (hours) | Moisture (%) | Urea Nitrogen (%) | Calcium (%) | Sulfur (%) | Adduct Urea (%) | Degree of Conversion (%) | Crush Strength (kgf/granule) |
|---|---|---|---|---|---|---|---|
| 0 | 0.56 | 30.50 | 10.52 | 8.22 | | | 3.50 |
| 2 | 0.47 | 29.10 | 10.00 | 7.85 | 10.21 | 35.10 | 3.30 |
| 4 | 0.56 | 26.40 | 10.85 | 8.45 | | | 3.20 |
| 6 | 0.69 | 24.70 | 11.90 | 9.73 | 12.73 | 51.62 | 3.60 |
| 8 | 0.62 | 23.70 | 12.39 | 9.44 | | | 3.80 |
| 10 | 0.56 | 23.17 | 11.76 | 9.13 | | | 4.00 |
| 12 | 0.72 | 25.11 | 10.77 | 8.76 | 11.50 | 45.80 | 3.10 |
| 14 | 0.36 | 28.60 | 11.90 | 9.00 | | | 3.90 |
| 16 | 0.35 | 28.50 | 10.40 | 11.20 | 11.85 | 41.60 | 3.70 |
| 18 | 0.39 | 27.95 | 10.00 | 9.32 | | | 3.30 |
| 20 | 0.24 | 26.50 | 11.31 | 9.52 | 12.43 | 46.90 | 3.40 |

TABLE 5-continued (27% nitrogen UCS granule)

| Time from first sample taken (hours) | Moisture (%) | Urea Nitrogen (%) | Calcium (%) | Sulfur (%) | Adduct Urea (%) | Degree of Conversion (%) | Crush Strength (kgf/granule) |
|---|---|---|---|---|---|---|---|
| 22 | 0.41 | 27.20 | 9.50 | 8.32 | | | 3.90 |
| 24 | 0.32 | 26.40 | 9.84 | 8.00 | | 76.40 | 3.80 |
| 26 | 0.39 | 30.68 | 9.70 | 7.10 | | | 3.90 |
| 28 | 0.33 | 31.90 | 8.60 | 6.00 | | 47.30 | 4.00 |
| 30 | 0.38 | 26.00 | 12.20 | 9.27 | | | 4.20 |
| 32 | 0.26 | 31.30 | 12.32 | 8.60 | | 43.30 | 4.40 |
| 34 | 0.40 | 30.50 | 12.14 | 8.35 | | | 3.90 |
| 36 | 0.49 | 31.47 | 10.20 | 7.23 | | | 3.60 |
| 38 | 0.25 | 30.76 | 10.10 | 9.30 | 12.36 | 40.20 | 3.50 |
| 40 | 0.33 | 27.20 | 10.90 | 9.15 | | | 3.70 |
| 42 | 0.41 | 26.50 | 12.80 | 10.90 | 13.32 | 50.30 | 3.30 |
| 44 | 0.50 | 26.90 | 11.20 | 10.10 | | | 3.50 |
| 46 | 0.47 | 27.30 | 10.10 | 9.70 | | | 3.60 |
| 48 | 0.46 | 30.50 | 9.50 | 7.40 | | 47.45 | 3.50 |
| 50 | 0.52 | 25.40 | 11.27 | 8.92 | | | 3.20 |
| 52 | 0.48 | 26.50 | 9.80 | 7.60 | | 45.30 | 3.40 |
| 54 | 0.50 | 30.10 | 9.30 | 7.20 | | | 3.30 |
| 56 | 0.34 | 27.40 | 9.00 | 7.00 | | 43.90 | 3.80 |
| 58 | 0.37 | 29.40 | 9.20 | 7.10 | | | 3.60 |
| 60 | 0.68 | 29.60 | 7.40 | 6.50 | | | 3.50 |

Example 3

Characterization of the UCS Fertilizer Granules from Example 2

Figure 2:
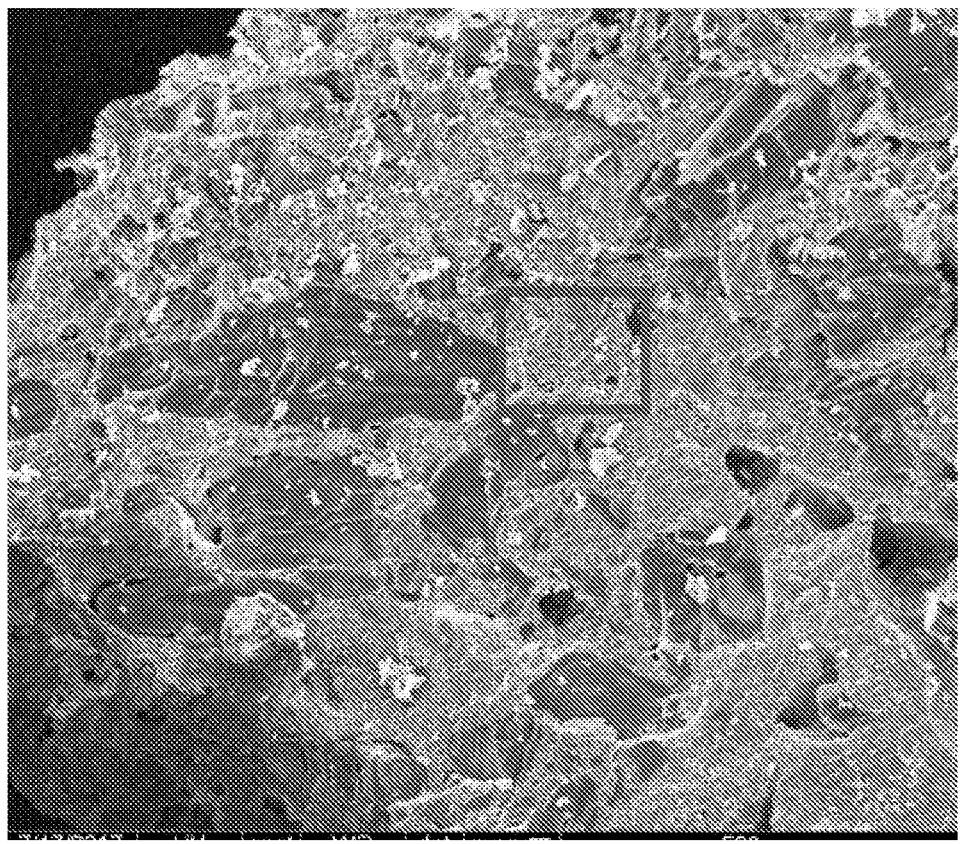
FIG. 2 is a scanning electron microscope (SEM) image of a cross-sectioned UCS fertilizer granule of the present invention showing imbedded particles.
Figure 3:
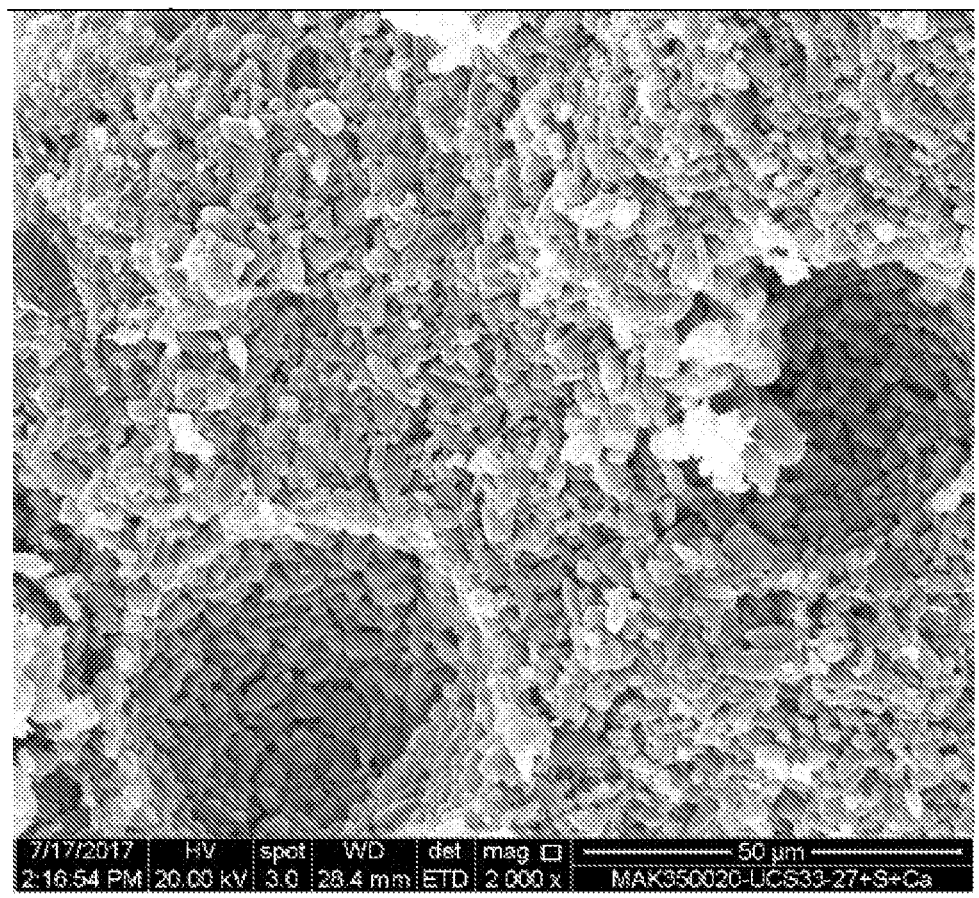
FIG. 3 is a SEM image of the matrix region marked in FIG. 2.

FIG. 2 is a SEM image of a UCS granule from Example 2. FIG. 3 is an SEM magnified image of a cross-sectional portion of the granule of FIG. 2. The instrument and setting used to obtain these SEM images are described in Table 6:

TABLE 6

| Instrument | HV, kV | WD, mm | Spot Size | Imaging Mode | Image Resolution |
|---|---|---|---|---|---|
| FEI Quanta 200 (SEM-2) | 20.0 | 20-30 | 3.0 | SE | 1024 × 784 |

From the SEMs, it was determined that the material has a granule morphology, with a presence of non-uniform distribution of internal darker irregular/elongated particles of size 15 to 900 microns. These particles were loosely packed in the central region of the granule. No layered structure was observed at the edges of the granule. A layer matrix was also observed, which was composed of agglomerated fused fine elongated particles of 1 to 5 microns. These smaller particles are believed to be urea particles, calcium phosphate particles, or additional calcium sulfur urea particles, or a combination thereof or all thereof.

Tables 7 and 8 provide characterization data for the UCS granules from Example 2, Tables 4 and 5, respectively.

Chemical analysis for nitrogen content was determined by the Total Nitrogen in Fertilizer by Combustion Technique described in AOAC official Method 993.13.1996 (AOAC International). Calcium content was determined by the Calcium by Atomic Absorption Spectrometric Method described in ISO 10084, 1992 (International Organization for Standardization). Sulfur content was determined by the Gravimetric Barium Sulfate Method described in ISO 10084, 1992 (International Organization for Standardization).

Particle size was determined using standard sieve test methods.

Crush strength was determined by a commercial compression tester (Chatillon Compression Tester). Individual granules between 2 to 4 mm in diameter were placed on a mounted flat (stainless steel) surface and pressure was applied by a flat-end rod (stainless steel) attached to the compression tester. A gauge mounted in the compression tester measured the pressure (in kilograms) required to fracture the granule. At least 25 granules were tested and the average of these measurements was taken as crush strength in kilograms. (Ref. method # IFDC S-115 Manual for determining physical properties of fertilizer-IFDC 1993).

TABLE 7

(Average Chemical & Physical Analysis for UCS Granule 33-0-0 + 5% S + 5% Ca)

| | Concentration (wt. %) |
|---|---|
| Chemical Analysis | |
| Total N | 34.2 |
| Sulphur | 5.1 |
| Calcium | 5.5 |
| Moisture | 0.54 |
| Physical Properties | |
| Particle size >4 mm | 20% |
| Particle size 2-4 mm | 58% |
| Particle size 1-4 mm | 78% |
| Particle size 1-2 mm | 20% |
| Particle size <1 mm | 1% |
| Crush Strength | 5.1 kg/granule |

TABLE 8

(Average Chemical & Physical Analysis for UCS Granule 27-0-0 + 7% S + 10% Ca)

| | Concentration (wt. %) |
|---|---|
| Chemical Analysis | |
| Total N | 27.8% |
| Sulphur | 8.4% |

TABLE 8-continued (Average Chemical & Physical Analysis for UCS Granule 27-0-0 + 7% S + 10% Ca)

| | Concentration (wt. %) |
|---|---|
| Calcium | 10.6% |
| Moisture | 0.46% |
| Physical Analysis | |
| Particle size >4 mm | 12% |
| Particle size 2-4 mm | 79% |
| Particle size 1-4 mm | 87% |
| Particle size 1-2 mm | 8% |
| Particle size <1 mm | 1% |
| Crush Strength | 3.6 kg/granule |

The invention claimed is:

1. A process to prepare a calcium sulfate urea fertilizer granule the process comprising:
    combining urea, hydrated or anhydrous calcium sulfate, and steam under conditions sufficient to form an aqueous solution comprising water, urea, and calcium sulfate, wherein the urea is solubilized in the aqueous solution;
    mixing the aqueous solution under conditions sufficient to produce a wet fertilizer granule comprising a calcium sulfate urea adduct and water; and
    removing at least a portion of the water from the wet fertilizer granule to form the calcium sulfate urea granule,
    wherein the calcium sulfate urea fertilizer granule formed comprises urea, calcium sulfate, and the calcium sulfate urea adduct, and
    wherein a portion of the surface of the calcium sulfate urea adduct includes a layer comprising urea, calcium sulfate, or the calcium sulfate urea adduct, or any combination or all thereof.

2. The process of claim 1, wherein the step (a) conditions comprise a temperature of 85° C. to 120° C.

3. The process of claim 1, wherein the wet fertilizer granule in step (b) includes a sufficient amount of water such that the composition is formable.

4. The process of claim 1, wherein step (c) comprises a temperature of 80° C. up to 100° C.

5. The process of claim 1, wherein at least 30% of the urea from step (a) is converted to the calcium sulfate urea adduct.

6. The process of claim 1, wherein the calcium sulfate urea fertilizer granule formed comprises 20 wt. % to 44 wt. % elemental nitrogen, 4.5 wt. % to 15 wt. % elemental calcium, and 4 wt. % to 12 wt. % elemental sulfur.

7. The process of claim 1, wherein the calcium sulfate urea fertilizer granule formed comprises 26.5 to 27.5 wt. % elemental nitrogen, about 8.5 to 10.5 wt. % elemental calcium, and 6.5 to 8.5 wt. % elemental sulfur.

8. The process of claim 1, wherein the calcium sulfate urea fertilizer granule formed comprises 32.5 wt. % to 33.5 wt. % elemental nitrogen, 4.5 wt. % to 5.5 wt. % elemental calcium, 4.5 wt. % to 5.5 wt. % elemental sulfur.

9. The process of claim 1, wherein the calcium sulfate urea fertilizer granule formed comprises less than 1 wt. % free moisture.

10. The process of claim 1, wherein the calcium sulfate urea adduct comprises $CaSO_4 \cdot 4CO(NH)_2$.

11. The process of claim 1, wherein the calcium sulfate urea fertilizer granule formed has a crush strength of 2 kg/granule to 5 kg/granule.

12. The process of claim 1, wherein the calcium sulfate urea fertilizer granule formed comprises calcium sulfate urea adduct particles, urea particles, and calcium sulfate particles.

* * * * *